Oct. 25, 1966  R. A. HATSCHEK  3,281,613
PIEZOELEMENT, IN PARTICULAR FOR PIEZOELECTRIC FORCE
MEASURING INSTRUMENTS
Filed Aug. 21, 1963
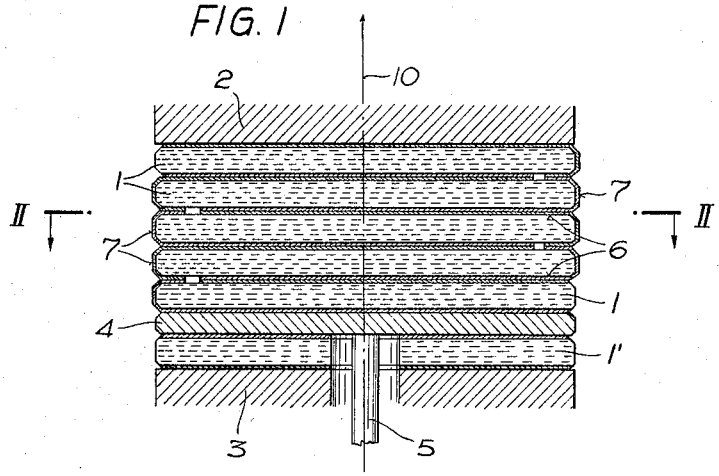
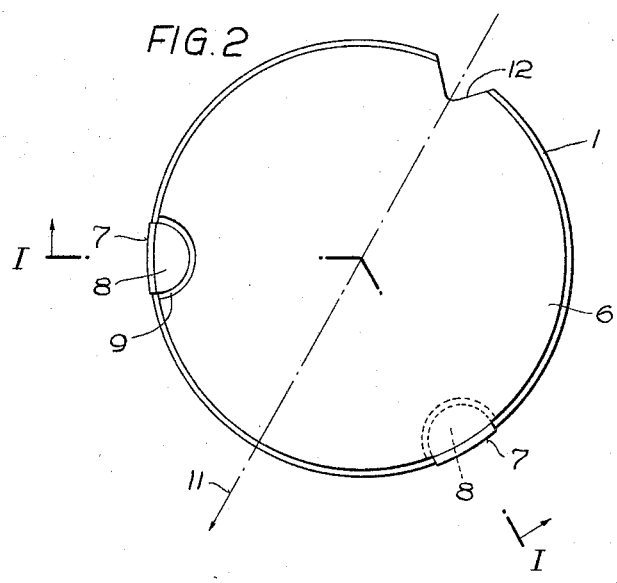
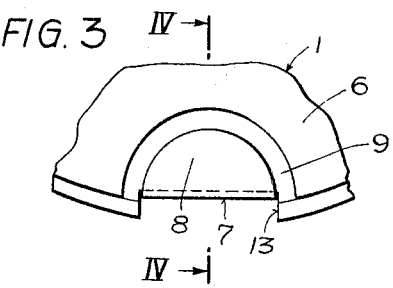
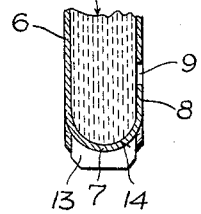
Inventor
Rudolf A. Hatschek
By Watson Cole Grindle & Watson
Attys.

United States Patent Office 3,281,613
Patented Oct. 25, 1966

3,281,613
PIEZOELEMENT, IN PARTICULAR FOR PIEZO-
ELECTRIC FORCE MEASURING INSTRUMENTS
Rudolf A. Hatschek, Vienna, Austria, assignor to
Hans List, Graz, Austria
Filed Aug. 21, 1963, Ser. No. 303,482
Claims priority, application Austria, Aug. 30, 1962,
6,952/62
5 Claims. (Cl. 310—9.8)

The invention relates to a piezoelement, in particular for piezoelectric force measuring instruments, comprising at least three superimposed plates of some piezoelectric material, preferably of quartz crystals and consisting of a plate assembly, electrodes being provided between said plates for the purpose of leaking the electric loads, electrodes of identical loads being conductively interconnected.

In conventional instruments of this type the homopolar electrodes are interconnected by means of conductors located outside the plate assembly and preferably made of wire or foils. As these conductors must be welded or soldered to the electrodes, the latter must be comparatively solid. As a result, the mass of the plate assembly and its dimensions are increased, which makes it difficult for the piezoelement to attain a high inherent frequency.

In addition, the interconnection of the electrodes by means of a wiring arranged at the sides of the plate assembly is cumbersome and requires additional space.

These drawbacks are overcome according to the invention by providing at least one electrically conductive connecting bridge for the interconnection of electrodes, said bridge being conductively connected with the electrode on a front surface of the plate but electrically insulated from the other electrode on the other front surfaces of the plate. Provision for connecting the electrodes can be made already prior to the assemblage of the plate assembly. The connecting bridges are attached to the plates and connected with one of the two electrodes of the plate so that the various electrodes are automatically interconnected as required during the assemblage of the plates.

In addition, the piezoelement according to the invention features considerable compactness and resistance to mechanical damage.

According to a further embodiment of the invention, each plate located inside the plate assembly can be equipped with two connecting bridges offset in a peripheral direction, each of them being conductively connected with another electrode, the extremities of the connecting bridges of adjacent plates which are insulated against the electrodes being preferably electrically interconnected, provided only that superposition of the insulated extremities of the connecting bridges of adjacent plates is avoided. Then each electrode inside the plate assembly is connected with the next electrode but one, by-passing the electrode located on the antipolar front surface of the same plate, so that the individual elements formed by the plates are electrically paralleled.

For the purpose of facilitating the assemblage of the plate assembly, according to the invention all of the plates constituting the plate assembly present at least one notch or the like on their periphery, in which a centering device for the assemblage of the plate assembly can engage. This design assures the accurate superposition of the insulated extremities of the connecting bridge of adjacent plates if the plate assembly is speedily assembled and eliminates the risk of short-circuits. Another noteworthy advantage may be derived, according to the invention, from the provision of notches in the plates at those points where the connecting bridges are located, rods made of some insulating material such as polytetrafluorethylene serving as centering means and remaining in the notches after the assemblage of the plate assembly, the connecting bridges being well protected inside the periphery of the plate assembly. If the centering rods remain in the notches, the plates of the plate assembly are maintained in their proper relation also after the piezoelement has been installed in a piezoelectric instrument, the connecting bridges being covered against the outside so as to be protected against mechanical damage.

The two connecting bridges of each plate can be offset in relation to each other by 180° or any other angle. According to a preferred embodiment of the invention, the two connecting bridges are arranged in symmetrical relation to the Y-axis of the plate, their distance from the Y-axis being such, depending on the number of plates constituting the plate assembly, as to assure symmetrical distribution of the Y-axes in the plate assembly. For example, the connecting bridges of a plate assembly comprising six plates are offset by an angle of 120° so that the Y-axis of each consecutive is offset by 120° in relation to the preceding plate. In this instance, the connecting bridges can also be offset by 60° only which also makes for a uniform distribution of the Y-axes ensuring uniform transversal sensitivity of the piezoelement.

According to a further embodiment of the invention, the electrodes located between the plates of the plate assembly can be constituted by very adhesive metal coatings of gold, silver or copper, for example, deposited on the front surfaces of the plates by vacuum vaporization or the like methods, the connecting bridges consisting of web-shaped metal deposits applied to the sidewall surface of the plates and connected with the metal coating of the front surfaces, the metal coating on each front surface being broken for electrical insulation in the area of one of the connecting bridges, thereby forming a lobate contact zone connected with the metal coating. In that case, it will not be necessary to provide special electrodes between the plates of the plate assembly consisting of piezoelectric material; consequently, the manufacture of the piezoelement is considerably simplified and its stock substantially reduced. No substance being required for the intermediate electrodes, it is also possible to achieve a particularly high inherent frequency of the piezoelement. The metal coats constituting the connecting bridges are preferably deposited on the plates simultaneously with the metal coating of the front surfaces, electrical insulation of the connecting bridges from the metal coat of a front surface of the plate being provided either by a lapping or etching operation or by covering a strip of the surface surrounding the extremity of the connecting bridge during the application of the metal coating by vaporization.

Finally, the plates of piezoelectric material constituting the plate assembly of the piezoelement according to the invention can present rounded-off edges in the area of the connecting bridges. This facilitates the application of the connecting bridges on the sidewall surface of the plates on the one hand and eliminates the risk of the material constituting the connecting bridges breaking at their edges or peeling off the plates, on the other hand. The latter circumstance is particularly important in the case of connecting bridges made of thin metal coatings applied to the sidewall surfaces either by vaporization or metallization. The rounding-off of the edges also facilitates the joint and simultaneous production of metal coatings on the front surfaces of the plates and of the web-shaped metal coats forming the connecting bridges on the sidewall surfaces.

Further details of the invention will appear from the following description of several embodiments of the invention with reference to the accompanying drawing in which FIG. 1 shows a cross-section of an embodiment on line I—I of FIG. 2, FIG. 2 a cross-sectional view of same on line II—II of FIG. 1, FIG. 3 is an elevation of a detail of another embodiment, and FIG. 4 a cross-section on line IV—IV of FIG. 3.

The piezoelement shown in FIG. 1 comprises six plates 1 of piezoelectric material, such as quartz or the like, superimposed so as to form a plate assembly. The plate assembly is clamped between two metal plates 2 and 3 serving also as ground electrodes. The second outer electrode 4 of the plate assembly consists of a metal plate inserted between the two bottommost plates of the plate assembly, from which a rod-shaped insulated conductor 5 extends through bores of the topmost plate 1' and the metal plate 3 to the outside.

The electrodes 6 located between the plates 1 are formed by very adhesive coatings of silver, gold, copper or the like and deposited on the front surfaces of the plates 1 by vacuum vaporization or the like methods. It is therefore, unnecessary to insert special intermediate electrodes between the plates 1 when assembling the plate assembly, as a result of which its dimensions and composition stock are reduced and its manufacture simplified. The drawing shows a considerably enlarged view of both the plates 1 and the metal coats 6.

The electrodes 6 are interconnected in such a way as to achieve paralleling of the individual piezoelectric elements constituted by the plates 1. The connecting bridges 7 are applied to the sidewall surfaces of the plates 1. The connecting bridges 7 are conductively connected with the electrode 6 on a front surface of each plate 1 but insulatingly separated from the electrode 6 on the other front surface of the plate 1. The plates 1 inside the plate assembly carry two connecting bridges 7 offset in relation to each other in a peripheral direction, each of said connecting bridges being conductively connected with another electrode 6. For the assemblage of the plate assembly, the plates 1 are superimposed in such a way that the insulated extremities of two connecting bridges of adjacent plates are conductively interconnected between each pair of plates 1. The connecting bridges 7 are preferably constituted by web-shaped metal coats connected with the metal coatings forming the electrodes 6 on the front surfaces of the plates 1 which may be deposited such as by vaporization on the plates 1 simultaneously with the metal coats. As appears from FIG. 2, the metal coating on each front surface of the plate 1 is broken for electrical insulation in the area of a connecting bridge 7, thus providing a lobate contact zone 8 connected with the metal coat forming the connecting bridge 7. In the composite plate assembly the contact zones 8 of adjacent plates facing each other are superimposed so that the electrodes 6 of identical loads are conductively connected between each other and with their associated outer electrodes. Preferably the contact zones 8 are produced simultaneously with the application of the metal coating to the front surfaces of the plates 1, the electrical insulation against the remaining metal coat forming the electrode 6 being subsequently achieved by a lapping or etching operation by means of which the metal coat is removed in the area of a separation zone 9. However, it is also possible to cover the separation zone 9 prior to the application of the metal coat on the front surface of the plate 1 so that no metal will be deposited on the plate in that place.

In order to facilitate the assembling of the plate assembly, all of the plates 1 constituting the plate assembly present at least one peripheral notch 12 as illustrated in FIG. 2, a centering device consisting of a rod or the like engaging in said notch during the assembling operation. This permits of speedy superposition of the plates while accurate registering of the contact zones 8 of adjacent plates is assured and short-circuits between the contact zones 8 and the electrodes 6 are avoided. Accurate centering of the plates of the plate assembly is particularly important in view of the smallness of the plates proper, of the contact zones 8 and in particular, of the separating zones 9 located between the electrodes 6 and the contact zones 8.

According to a slightly modified embodiment of the invention as shown in FIGS. 3 and 4, the centering notches 13 are provided at the locations of the connecting bridges on the plate 1, rods made of insulating material such as polytetrafluoroethylene for example, serving as centering means which may remain in the notches 13 also after the assembling of the plate assembly. As a result, the plates 1 remain positively centered also upon completion of the plate assembly and during the use of the piezoelement. The rods of insulating material inserted in the notches 13 have their external surface adapted to the sidewall surface of the plates so as to produce a smooth outer surface of the plate assembly. As appears also from FIG. 4, the plates 1 may present rounded-off edges 14 in the area of the connecting bridges 7. As a result, the continuous metal coating forming the electrode 6 on the front surface of the plate 1, the connecting bridge 7 and the contact zone 8 adheres positively to the plate and will not peel off said plate 1 anywhere. As shown in FIG. 4, notches 13 for the centering of the connecting bridges 7 may also be provided if the edges of the plate 1 are rounded off.

With the piezoelement according to the invention the longitudinal piezoelectric effect is utilized, the force acting on the piezoelement being applied in the direction of the X-axis 10 illustrated in FIG. 1. In actual pratice, however, forces acting in a direction perpendicular to the X-axis 10 are also effective producing likewise loads at the electrodes due to the transversal piezoelectric effect. In order to assure three-dimensionally uniform transversal sensitivity of the piezoelement, the plates 1 are preferably superimposed in such a manner as to produce symmetrical distribution of the Y-axis of the plates. This is simple to achieve by arranging the two connecting bridges 7 of each plate 1 straight away in symmetrical relation to the Y-axis of the plate, subordinating their distance from the Y-axis (FIG. 2, reference number 11) to the number of plates constituting the plate assembly. For example, in the embodiment illustration comprising six superimposed plates 1, symmetrical distribution of the Y-axes in the plate assembly is achieved by offsetting the connecting bridges 7 by an angle of 120°. Within the scope of the present invention special electrodes consisting of metal disks of foils can be inserted between the plates 1 in lieu of the electrodes 6 formed by metal coatings on the front surfaces of the plates 1, each of the said special electrodes being conductively connected with one of the connecting bridges and presenting an appropriate recess in the area of the other connecting bridge for receiving the contact zone of the connecting bridge insulated from the electrode. In this case too, a noteworthy advantage can be derived from the fact that the individual plates constituting the plate assembly can be prefabricated to such an extent that no finishing operation is required following the assemblage of the plate assembly.

I claim:

1. A piezoelectric crystal unit, in particular for piezoelectric gauges, comprising a plurality of plates of a piezoelectric material as quartz, said plates being superimposed face to face so as to form a plate assembly, each of the plates being provided with electrodes in the form of electrically conductive coatings on both front surfaces thereof, at least one of the said electrodes of each plate having a recess open to the periphery of the plate, electrically conductive connecting bridges in the form of web-shaped metal coatings extending from the electrode on one front surface of the plate across its peripheral area to the said recess of the electrode on the other front surface of said plate, the one extremity of the connecting bridge located within the said recess being electrically insulated from the electrode forming said recess, the other end of the connecting bridge conductively connected with the electrode on the opposite front surface of the plate.

2. A piezoelectric crystal unit according to claim 1, in which each plate located inside the plate assembly is provided with two connecting bridges arranged in staggered relation to each other, each of the said connecting bridges being conductively connected with another electrode, the said insulated extremities of the connecting bridges of adjacent plates being conductively interconnected.

3. A piezoelectric crystal unit according to claim 1, in which each of the said plates have a notch at least at one point of the periphery, said notch serving for the engagement of a centering device for the assemblage of the plate assembly.

4. A piezoelectric crystal unit according to claim 3, in which the said notches are provided at those points of the said plates where the connecting bridges are located, strips of insulating material as polytetrafluoroethylene serving as centering elements for the plates and extending within said notches from one to the other front surface of the said plate assembly.

5. A piezoelectric crystal unit according to claim 2, in which the said two connecting bridges of each plate are arranged in symmetrical relation to a Y-crystal axis of the plate, the said Y-crystal axes of adjacent plates forming equal angles wherein the sum of these angles amounts to a multiple of 360 degrees.

References Cited by the Examiner
UNITED STATES PATENTS

| | | | |
|---|---|---|---|
| 3,047,749 | 7/1962 | Fisher | 310—9.4 |
| 3,060,333 | 10/1962 | Bradley | 310—8.4 |
| 3,073,975 | 1/1963 | Bigler et al. | 310—9.4 |
| 3,075,098 | 1/1963 | Shoor | 310—9.1 |
| 3,179,826 | 4/1965 | Trott et al. | 310—9.7 |

MILTON O. HIRSHFIELD, *Primary Examiner.*

ORIS L. RADER, *Examiner.*

A. J. ROSSI, *Assistant Examiner.*